United States Patent
Ligman et al.

(10) Patent No.: US 11,403,196 B2
(45) Date of Patent: Aug. 2, 2022

(54) WIDGET PROVISIONING OF USER EXPERIENCE ANALYTICS AND USER INTERFACE / APPLICATION MANAGEMENT

(71) Applicant: International Business Machines Corporation, Armonk, NY (US)

(72) Inventors: Joseph W. Ligman, Wilton, CT (US); Marco Pistoia, Amawalk, NY (US); Gegi Thomas, Piermont, NY (US); Stephen P. Wood, Thornwood, NY (US)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 16/510,047

(22) Filed: Jul. 12, 2019

(65) Prior Publication Data
US 2019/0340093 A1 Nov. 7, 2019

Related U.S. Application Data

(63) Continuation of application No. 15/438,695, filed on Feb. 21, 2017, now Pat. No. 10,621,062.

(51) Int. Cl.
*G06F 11/30* (2006.01)
*G06F 11/34* (2006.01)
(Continued)

(52) U.S. Cl.
CPC .............. *G06F 11/302* (2013.01); *G06F 8/38* (2013.01); *G06F 9/451* (2018.02);
(Continued)

(58) Field of Classification Search
CPC ......... G06F 16/9535; G06F 8/38; G06F 9/451
(Continued)

(56) References Cited

U.S. PATENT DOCUMENTS 5,896,532 A 4/1999 Blewett
9,141,276 B2 9/2015 Dawes et al.
(Continued)

OTHER PUBLICATIONS

Disclosed Anonymously, Creating Slop for Instrumentation Code in a Large Object File, An IP.com Prior Art Database Technical Disclosure, IP.com No. 000241022, Mar. 20, 2015, pp. 1-5.
(Continued)

*Primary Examiner* — Hung T Vy
(74) *Attorney, Agent, or Firm* — Scully, Scott, Murphy & Presser, P.C.; Daniel P. Morris

(57) ABSTRACT

A method for tracking user interactions with an application includes: storing the application in a memory of a mobile device, the application being associated with an instrumented widget and a library, the widget including an event logger; executing the application and the widget; receiving, through a user interface of the mobile device, an input corresponding to the event logger of the widget; logging, by the library, the input corresponding to the event logger of the widget in the memory of the mobile device; filtering a plurality of events, including the input corresponding to the event logger of the widget, to manage what data is reported to a monitor; and transmitting the input corresponding to the event logger of the widget to a server as monitored data.

19 Claims, 9 Drawing Sheets

(51) Int. Cl.
  *G06F 9/451* (2018.01)
  *G06F 8/38* (2018.01)
  *G06F 16/25* (2019.01)

(52) U.S. Cl.
  CPC ...... *G06F 11/3075* (2013.01); *G06F 11/3438* (2013.01); *G06F 16/256* (2019.01)

(58) Field of Classification Search
  USPC ................................................ 707/634, 754
  See application file for complete search history.

(56) References Cited

U.S. PATENT DOCUMENTS

| | | | |
|---|---|---|---|
| 9,542,173 B2 | 1/2017 | Dehmann et al. | |
| 9,946,622 B2 | 4/2018 | Brough | |
| 10,481,927 B2* | 11/2019 | Suryanarayana | ......... G06F 8/65 |
| 2005/0177837 A1* | 8/2005 | Mensah | .................... G06F 9/46 |
| | | | 719/328 |
| 2009/0094584 A1 | 4/2009 | Dheap | |
| 2010/0037211 A1 | 2/2010 | Zakonov | |
| 2013/0073632 A1* | 3/2013 | Fedorov | ................. G06Q 50/01 |
| | | | 709/205 |
| 2014/0317734 A1* | 10/2014 | Valencia | ............... G06F 21/316 |
| | | | 726/22 |
| 2015/0242297 A1 | 8/2015 | Johnson, Jr. et al. | |
| 2015/0350068 A1* | 12/2015 | Tung | .................... H04W 80/06 |
| | | | 370/392 |

OTHER PUBLICATIONS

IBM, A Method and System for Runtime Program Error Detection by Using Disposable Instrumentation, An IP.com Prior Art Database Technical Disclosure, IP.com No. 000180274, Mar. 6, 2009, pp. 1-30.

* cited by examiner

FIG. 7

```
1   public class Button extends android.widget.Button { private static final int logLevelClick;
        private static final int logLevelLongClick;
5       private static final int logLevelFocus;
        static {
            logLevelClick    =
    LogLevelConfig.getLogLevel(LogLevelConfig.TLF_LOGTYPE_BUTTON,
    LogLevelConfig.TLF_LOGLEVEL_CLICK);
10          logLevelLongClick =
    LogLevelConfig.getLogLevel(LogLevelConfig.TLF_LOGTYPE_BUTTON,
    LogLevelConfig.TLF_LOGLEVEL_LONGCLICK);
            logLevelFocus    =
    LogLevelConfig.getLogLevel(LogLevelConfig.TLF_LOGTYPE_BUTTON,
15  LogLevelConfig.TLF_LOGLEVEL_FOCUS);
        } public Button(Context context) {
            super(context);
20      } public Button(Context context, AttributeSet attrs) {
            super(context, attrs);
        }
25
        public Button(Context context, AttributeSet attrs, int defStyle) {
            super(context, attrs, defStyle);
        }

30      @Override
        public boolean performClick() {
            if (logLevelClick >= 0) {
                Tealeaf.logEvent(this, "OnClick", logLevelClick);
            }
35          return super.performClick();
        }

@Override
        public boolean performLongClick() {
40          if (logLevelLongClick >= 0) {
                Tealeaf.logEvent(this, "OnLongClick", logLevelLongClick);
            }
            return super.performLongClick();
        }
45
        @Override
        protected void onFocusChanged(boolean gainFocus, int direction, Rect previouslyFocusedRect) {
            if (logLevelFocus >= 0) {
50              Tealeaf.logEvent(this, gainFocus ? Tealeaf.TLF_ON_FOCUS_CHANGE_IN
    : Tealeaf.TLF_ON_FOCUS_CHANGE_OUT, logLevelFocus);
            }
            super.onFocusChanged(gainFocus, direction, previouslyFocusedRect);
        }
    }
```

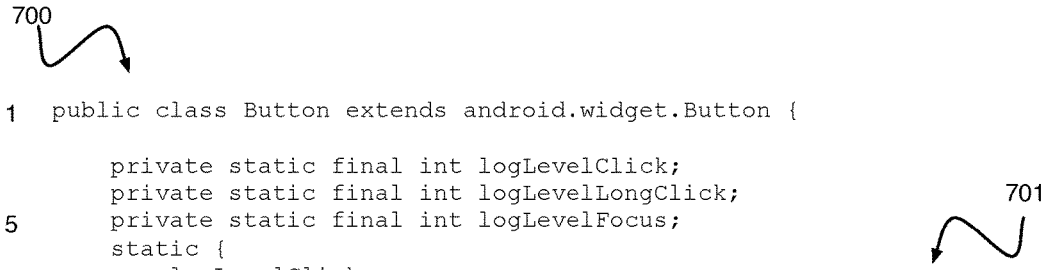

WIDGET PROVISIONING OF USER EXPERIENCE ANALYTICS AND USER INTERFACE / APPLICATION MANAGEMENT

CROSS-REFERENCE TO RELATED APPLICATIONS

The present invention is a continuation of U.S. patent application Ser. No. 15/438,695 filed Feb. 21, 2017, having the same title and inventors as the present application, the disclosure of which is hereby incorporated by reference herein in its entirety for all purposes.

BACKGROUND

The present disclosure relates to mobile applications, and more particularly, to instrumenting widgets used by applications.

Customers demand mobile applications that are responsive, easy to use, and intuitive. These customers are often quick to find other solutions if a mobile application presents an issue, and the issue is not quickly addressed. While significant effort goes into designing and testing the user interfaces of mobile applications, in many cases problems and usability issues do not become apparent until the application has been deployed, which can require rolling out application updates. These issues can occur despite best efforts used during the implementation and testing phases of application development. Collecting actual behavior of the application following its deployment is important to the application's overall success with customers.

Currently, customer analytics platforms exist for providing digital customer experience management and customer behavior analysis solutions. One example is TEALEAF, which is a customer experience management solution to help companies meet online conversion and customer retention objectives. One goal of these systems is to determine how users or customers are interacting with a given product.

BRIEF SUMMARY

According to an exemplary embodiment of the present invention, a method includes storing an application in a memory of a mobile device, wherein the application is associated with a widget and a library, wherein the widget includes an event logger and the library manages the widget, executing, by the mobile device, the application and the widget, receiving, through a user interface of the mobile device, an input corresponding to the event logger of the widget, logging, by the library, the input corresponding to the event logger of the widget in the memory of the mobile device, and reporting, by the library, the input corresponding to the event logger of the widget to a remote monitoring server as monitored data.

According to an exemplary embodiment of the present invention, a method includes executing an application on a mobile device, the application stored in a memory of the mobile device, wherein the application is associated with a widget and a library managing the widget, receiving, by the library, a configuration request from a remote server, and adapting, by the library, the widget using the configuration request.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

End-to-end instrumented widget implementation;
 Consistent user experience with instrumented and non-instrumented widgets;
 Configurable widgets;
 Consistent monitoring and management functionality; and
 Simplified and standardized function addition for an application.

These and other features and advantages of the present invention will become apparent from the following detailed description of illustrative embodiments thereof, which is to be read in connection with the accompanying drawings.

BRIEF DESCRIPTION OF THE SEVERAL VIEWS OF THE DRAWINGS

Preferred embodiments of the present invention will be described below in more detail, with reference to the accompanying drawings:

FIG. 7 is a view of code of an instrumented widget according to embodiments of the present invention;

DETAILED DESCRIPTION

Figure 1:
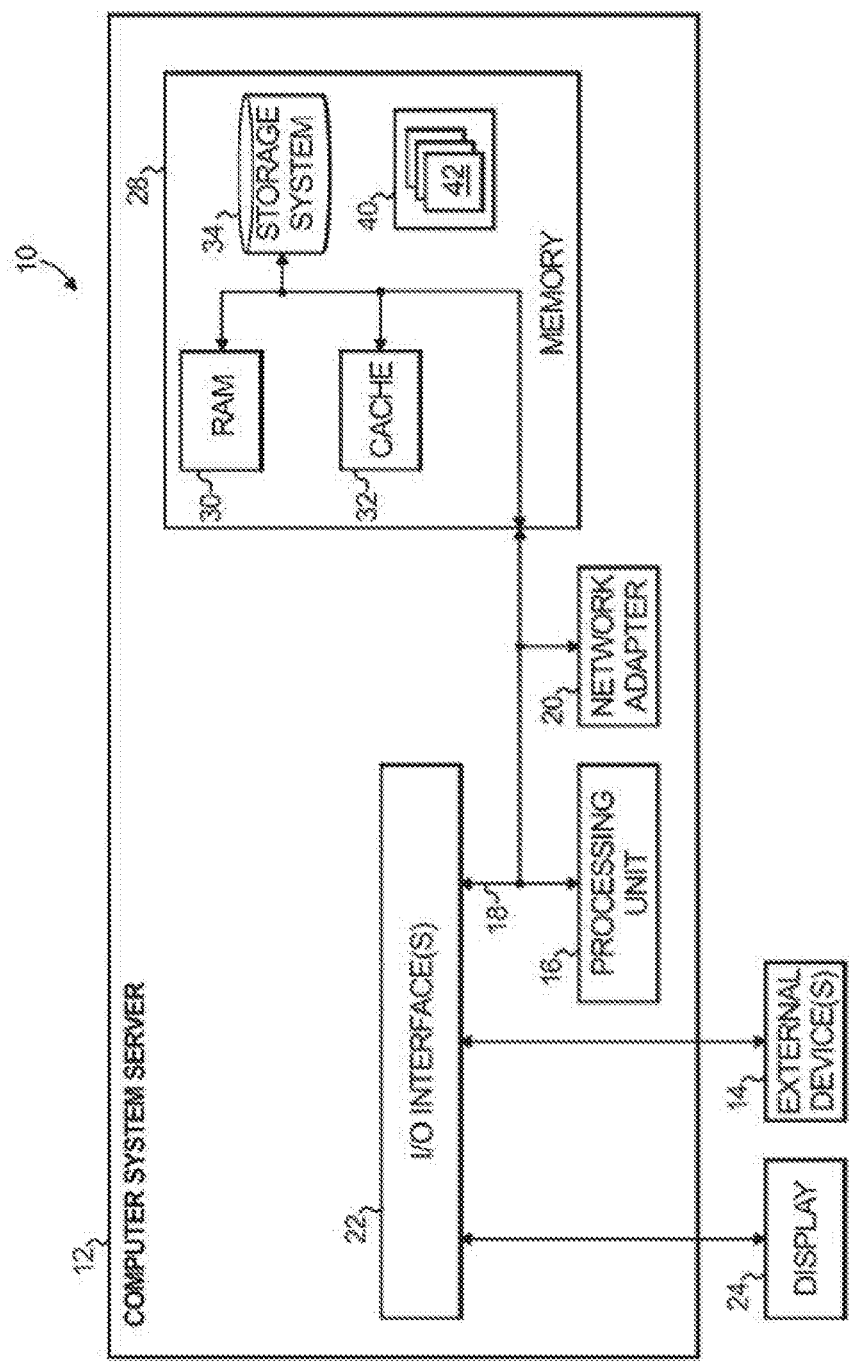
FIG. 1 depicts a cloud computing node according to an embodiment of the present invention.

According to one or more embodiments of the present invention, an instrumented application (i.e., an application using an instrumented widget) allows developers and other stakeholders to gain insight into user interactions with the application. For example, the instrumented application can reveal activity such as user navigation within the application, pauses in user activity, etc. Data about this activity can be used to determine why a user is, or is not, navigating to certain pages in the application, why users are, or are not, buying certain products or services using the application, etc.

As used herein, widgets are code modules including a user interface (UI) aspect or UI elements that enable interaction with an application. Widgets are instantiated by the application at run-time. Exemplary widgets include buttons, checkboxes, menus, etc. Instrumented widgets include computer readable code enabling one or more functions, including activity tracking, analytics, anomaly detection, etc. In at least one embodiment of the present invention, an instantiated, instrumented, widget is used to control a function of the application, and includes a pre-defined a graphical representation or user interface that the application implements, for example, depicting the button being clicked/pressed, checkboxes being checked/unchecked, menus providing a list of items from which to choose, etc.

According to one or more embodiments of the present invention, the instrumented application is automatically created by visually (e.g., using a palette of available widgets) and/or manually (e.g., inserting widgets into the application code) assembling instrumented components, including widgets. Again, instrumented widgets include computer readable code enabling one or more functions, including activity tracking, analytics, anomaly detection, etc. In the exemplary case of an instrumented button widget, the widget includes button functionality and functionality for a logging call (e.g., computer readable code facilitating monitoring by another device). According to one or more embodiments of the present invention, the instrumented button widget is embodied as a new class, e.g., a 'Button+Logging' sub-class.

According to one or more embodiments of the present invention, the instrumented widgets work in conjunction with a library, which is included by the application, where the library handles the instrumentation functionality added to the widgets (e.g., logging, control and management of the widgets) on behalf of the application. According to one or more embodiments of the present invention, the instrumentation functionality is dynamically injected into an existing widget at runtime, for example, with a developer using an existing Button widget and a library injecting the logging functionality into the widget at runtime to create the instrumented Button widget.

According to an embodiment of the present invention, the library includes code that adds logic (e.g., logging, control and/or management logic) to augment existing widgets by dynamically extending the widgets at run-time (for example, as compared to extending the widgets statically at compile time via sub-classing). The library code implements the additional logic using methods supported by the operating system, for example, swizzling for iOS, or byte code rewriting for JAVA. In at least one embodiment of the present invention, the library code is run at application start-up time to augment the widgets, readying the widgets (i.e., creating one or more instrumented widget) for instantiation by the application. In at least another embodiment of the present invention, the library code is run on-demand when the application attempts to call or use a widget.

In view of the foregoing, it should be understood that, in the case of augmented widgets, the library can augment a widget at startup of the application or in a just-in-time fashion before the application instantiates the widget.

According to one or more embodiments of the present invention, different types of instrumented widgets are available, including augmented widgets created by runtime injection and pre-built instrumented widgets created at compile time. In both cases the application can interact with the instrumented widgets directly, for example, to detect clicks, change text on Buttons, etc. The library also interacts with the instrumented widgets for the logging and management aspects.

In the exemplary case of runtime injection, an existing Button widget is effectively sub-classed to create a new widget that includes the ability to log clicks. With runtime injection or alteration, the existing code or class is still referenced or used by a main code body of the application, but a function of the existing code is altered or augmented. This additional functionality is added at runtime by dynamically altering the code of the existing Button. Techniques such as swizzling for iOS, or byte code rewriting for JAVA, are examples of technology that can be used to alter existing widget behavior dynamically. Again, in the exemplary case of runtime injection, the application developer continues to use the existing Button in assembling the application, with the library dynamically altering the Button code at runtime. In either example (i.e., runtime injection or statically created instrumented widgets using sub-classes), the widget behaves in a like manner and as expected by the developer.

According to an embodiment of the present invention, the library interacts with a remote server. The library gathers logging events from the instrumented widgets of the application and sends the logging events to the remote server as monitoring information. By passing the logging events through the library, bandwidth management tools can be used, controlling what monitoring information is sent to the server. For example, given an application including a library that has locally recorded certain UI events, the library can select what information to send to the server, such as by using a priority of events, taking into account what monitoring information has been recently sent, a current network connection type of a device executing the application, etc. The library also acts to receive control requests from the server and forwards the control requests to the appropriate widgets to enact the control request. For dynamic injection the library also includes logic to dynamically alter the existing widgets' logic to incorporate new functionality.

In one or more embodiments of the present invention, an instrumented widget includes code for logging events and sending the monitoring information to the server without the aid of the library.

According to one or more embodiments of the present invention, instrumentation automatically enables application features such as analytics, security, anomaly detection, adaptive UI modification, and application management; as the code for monitoring and management is contained in the widgets and one or more associated libraries. According to one or more embodiments of the present invention the code for monitoring and management is not added to event handlers in the main code body of the application. According to one or more embodiments of the present invention, monitoring and management functions are added to the application in a standardized manner in the form of instrumented widgets. According to one or more embodiments of the present invention, the instrumentation is dynamically configurable at runtime, thereby allowing the additional application features (e.g., analytics, security, anomaly detection, adaptive UI modification, application management, etc.) to be dynamically modified. According to one or more embodiments of the present invention, modifying the instrumentation configuration at runtime does not require recompiling the application's source code and/or reprovisioning the application to the devices on which the application had been previously installed.

While one or more embodiments of the present invention concern a mobile device running an application to perform certain technological acts, these and other embodiments can be implemented using a cloud architecture, such as the implementation of the monitoring server, which receives and sends data to the library. As such, a description of cloud computing follows.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Figure 2:
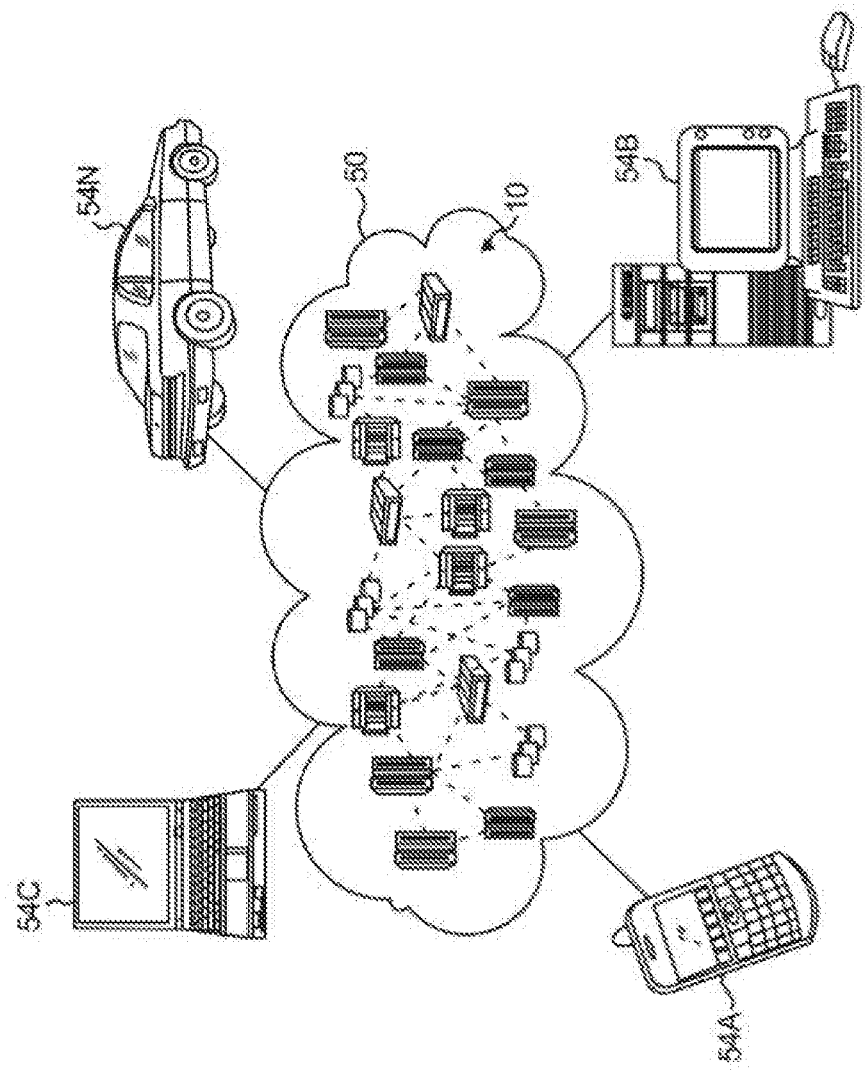
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
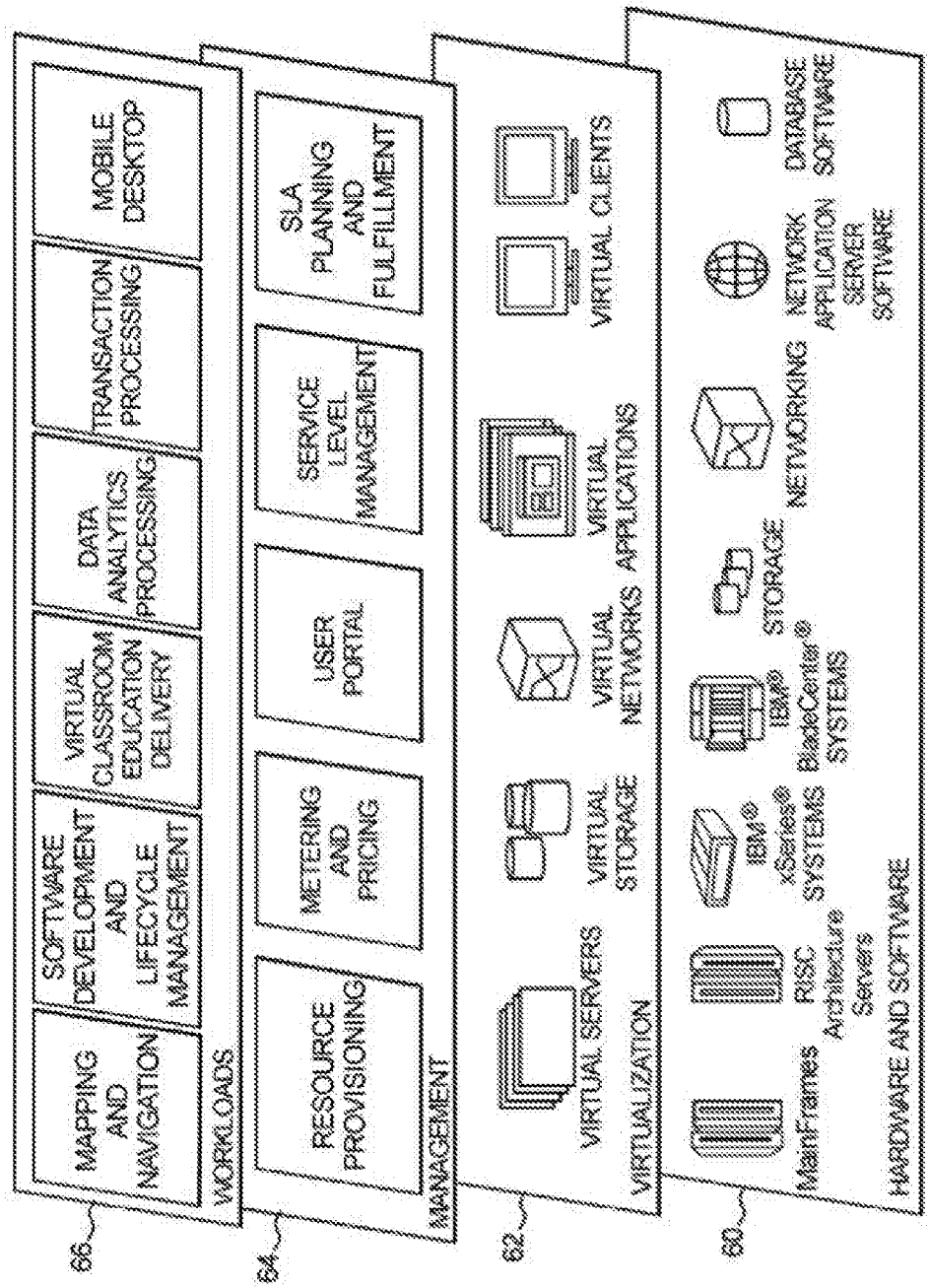
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

A mobile application, or app, is a software program executable by a mobile device such as a smartphone, tablet or music player. Mobile applications can exist in one or a variety of states. For example, a currently executing and visible application (i.e., in the foreground) is said to be the active, visible or foreground application. Other applications can be executing, but not visible, and are considered background applications. Still other applications can be in the background, but not executing, and are considered suspended or empty applications. While these definitions are provided for a general overview of applications states, it should be understood that additional states can be used, for example, in the case where an operating system supports multiple visible applications, which can be prioritized.

One or more embodiments of the present invention advantageously overcome problems arising from application development approaches using available Software Development Kits (SDK), where logging calls are added to the main application code at sites in the code where the interaction events, originating with UI widgets, are processed. In such a case logging and application specific code are co-mingled, which can raise cross-cutting issues. More particularly, in cases where the logging calls are added to the main application code, the developer is required to implement an interface that is defined by the widget to receive event notification and register this with the widget. In these cases the application specific code is mingled with the code to log the event. According to one or more embodiments of the present invention, a set of instrumented widgets are used by the application to log events; the widgets themselves log the events with the library. In this way, the main code body of the application is not modified to add the logging functionality.

According to one or more embodiments of the present invention, developers are provided with a plurality of instrumented widgets, such as in a palette, to build out application code for a particular UI. According to one or more embodiments of the present invention, logging or monitoring functionality is built into one or more of the widgets. In this way, logging is consistent, where the same type of data is monitored no matter which developer uses the widget. Further, such a standardized logging approach addresses a problem of unreliable and inconsistent logging.

According to one or more embodiments of the present invention, code embodying the logging functionality can be enabled or disabled via a configuration file. The configuration file is dynamically updatable (e.g., by a central server) allowing the management of what data is logged. For example, additional logging (e.g., more than a default set of data) can be enabled during a problem resolution period. According to one or more embodiments of the present invention, the default set of data to be logged can depend on the needs of the application, developer, user considerations, etc. According to one or more embodiments of the present invention, the user considerations can include user centric costs, e.g., bandwidth use, battery life, etc., ensuring that an overall experience of using the application is not degraded due to the logging.

According to one or more embodiments of the present invention, the palette of instrumented widgets with logging calls is used by a developer directly through code instantiation or by a UI developer dragging and dropping instrumented widgets from the palette in a user interface builder tool.

According to one or more embodiments of the present invention, the instrumented widgets are completely pre-built or dynamically augmented at runtime via techniques such as code injection, byte code modification, etc. According to one or more embodiments of the present invention, in either case, the library is used to manage the widget functions.

Referring now to an exemplary implementation of one or more embodiments of the present invention, given an existing Button widget, if a developer wants to have a Button+Logging widget, the logging code is added at compile time, such that the Button+Logging widget is pre-built. In an alternative, the existing Button widget can be dynamically augmented at runtime, adapting an existing Button to add the Logging functionality. These examples have similar effects; in the pre-built case the developer explicitly uses a Button+Logging widget when building the app, while in the adapted case, the developer continues to use the existing Button, and the Button code is dynamically augmented for the application, for example, at application startup, by additional library code which contains the dynamic modification capability.

According to one or more embodiments of the present invention, static addition of logging calls can be implemented by adding code to existing widgets, assuming a developer has access to source code of the widget. According to one or more embodiments of the present invention, instrumented widgets are made part of an application development platform, with the provision to extend or sub-class non-instrumented widgets.

Figure 4:
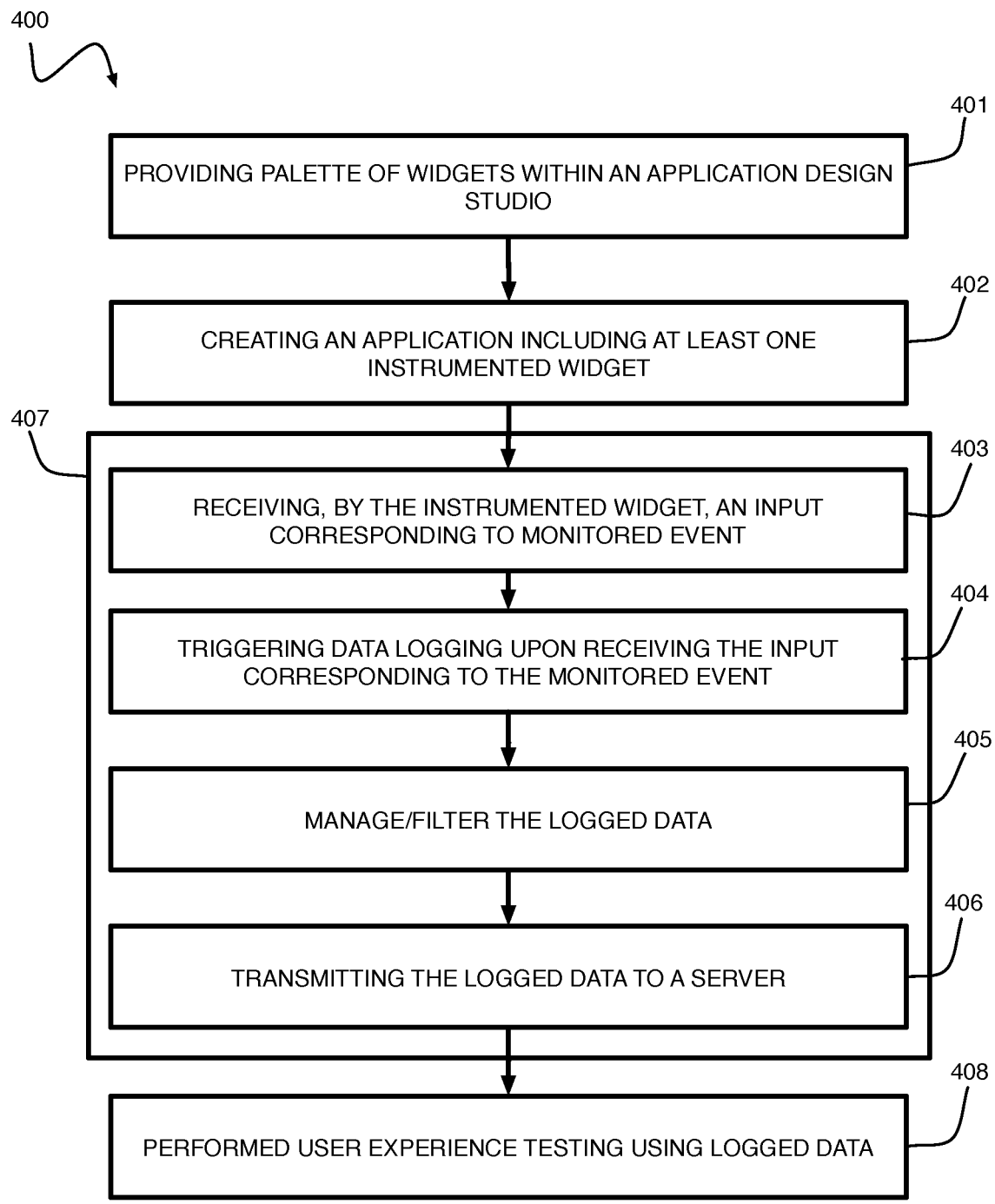
FIG. 4 is a flow diagram of a method for creating and deploying an application that uses instrumented widgets according to an embodiment of the present invention.

According to an embodiment of the present invention, a method of creating an application including instrumented widgets 400 includes providing an application development platform including at least one instrumented widget 401 available through a palette or other selection mechanism, wherein the application development platform is used in creating the application 402. It should be understood that the addition of the instrumented widget can be performed at development time or after the application has been developed. In FIG. 4, blocks 403-406 (i.e., block 407) represent steps performed by a mobile device running the created application, which includes an instrumented widget. The instrumented widget of the application received inputs to the application 403, controls the logging or monitoring of data 404 and any subsequent transmission of logged data 406, as referred to as management of the logged data. Logged data, transmitted to a server, can be analyzed for user experiences with the application 408, which can in used in further application development.

According to an embodiment of the present invention, the logged data is filtered 405 prior to transmitting logged data to the server at 406. According to one or more embodiments of the present invention, a widget reports log data to the application, where the log data is collected by the library of the application. Here, the library includes server functionality and is configured to send and/or receive log data, route instructions to one or more widgets, etc. In this way, the application can manage and/or filter, via the library, what data is reported to a monitor 405. For example, if a user switches from a cellular connection to a Wi-Fi data connection, the application reports additional logged data to the monitor, where it is assumed that the Wi-Fi data connection provides relatively high bandwidth conditions. In the case of a cellular connection, even though the Button logs events, the library can be configured to discard certain data, thereby managing how much bandwidth the logging traffic consumes. In at least one embodiment of the present invention, a frequency of reporting is reduced as a battery level of the mobile device decreases. It should be understood that the reporting can be managed using these and other device conditions.

Figure 5:
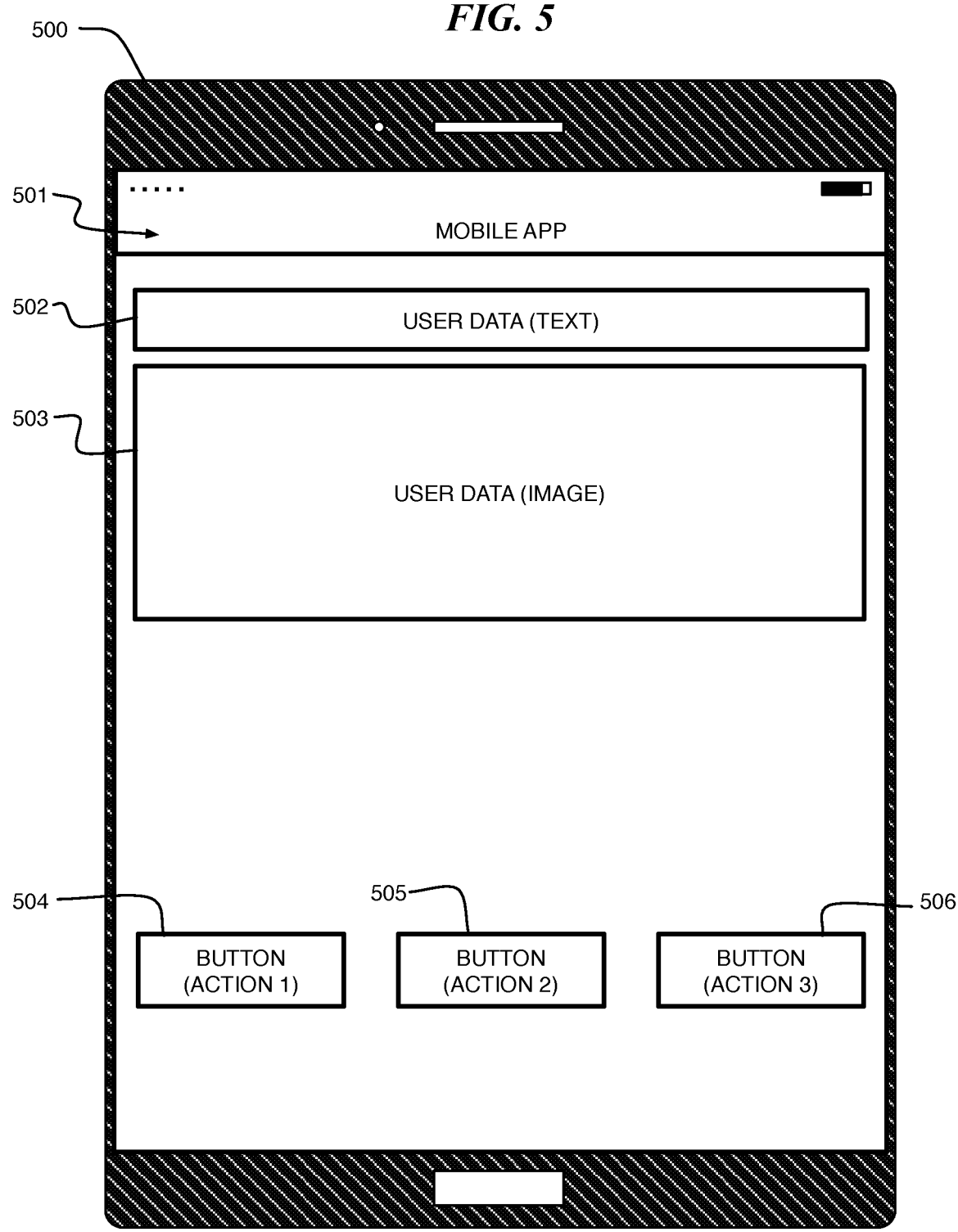
FIG. 5 is a view of a mobile device running an application deployed according to an embodiment of the present invention.

FIG. 5 shows a mobile device 500 displaying an application UI 501, which has been created including at least one instrumented widget (e.g., button 504). FIG. 5 further shows a text box 502 including user text data, a field showing user image data 503 and three control buttons 504-506. One or more of these features corresponds to an instrumented widget.

According to one or more embodiments of the present invention, to update the application and alter the UI (see FIG. 6, method 600), configuration information is sent to the mobile device to alter the instrumented widget's (and the application's) behavior. A functional change or update is determined for the existing UI at a control center (e.g., server) 601, for example, based on monitored data collected or from some other requirement (e.g., coming from users). A configuration request is created by the control center and provisioned to the mobile device (e.g., by push, request/reply, etc.) 602. Once the configuration request is received by the mobile device 603, the library code associated with the managed widget acts on the received configuration request to adapt the UI 604. The adaptation of the UI includes calling upon a control mechanism in the instrumented widget to enact the request. As a result, the widget's (and application's) function is updated without a traditional binary update or patch. Stated another way, the instrumentation configuration of the application is modified without recompiling the application's source code and/or reprovisioning the application to the mobile device.

According to an embodiment of the present invention, library code for managing the widget uses overriding methods in a subclass. For example, in a case where a widget is to be removed from a UI, a hiding technique can be used where the method setVisibility( ) is overridden to allow the library to manage the function. According to an embodiment of the present invention, changes to the UI behavior are transparent to the application code, such that the UI and application continues to work according to the application developers original expectations (e.g., without introducing the potential for new faults). Stated another way, changes to the UI behavior (as experienced by the end-user of the application) are transparent to the original application code, which continues to function as coded by the developer. Here, the end-user of the application sees a change in UI behavior due to the instrumentation, while the main code body of the application does not perceive the change and continues to function unaffected by the alteration (i.e., the change is transparent to the main code body of the application).

According to an embodiment of the present invention, the widget can be managed by the library in cases of conflict. For example, for a widget permanently hidden according to a configuration request, if the application attempts to set the method setVisibility( ) to visible for the widget, the state of the widget is shadowed by the library, wherein the widget returns a shadow state (i.e., setVisibility( )=visible) to the application while the widget's actual state (including, for example, a portion of the UI occupied by the widget) is managed via the library.

According to an embodiment of the present invention, in a case where the application is modified, removing a widget's functionality from the UI, any calls made by the application to the method are ignored (e.g., attempts to set the method setVisibility( ) for the widget). In this example, the term "ignore" refers to the visibility value stored by the application, apart from the library, so that the application is unaware that it is being managed by the library.

According to an embodiment of the present invention, certain behaviors managed by the library (e.g., logging behavior) need not change the original behavior of the UI. In this case, the application continues to behave according to the main code body of the application, while the instrumented function in the widget makes calls to the original methods in the super class. Here, the logging behavior is transparent to the main code body and the end-user.

FIG. 7 is an example of code 700 for the ANDROID operating system, which implements an instrumented Button (e.g., button 504) including code implementing logging calls in the context of application monitoring. The code of FIG. 7 includes a central configuration (i.e., LogLevelConfig.) enabling events to be selectively logged/monitored for each widget type. The code of the instrumented Button inherits and behaves as a standard platform Button would, and in addition includes logging functionality. In this example, the code includes instructions to log three events of the instrumented Button. The logging level can be set, and if negative, can be disabled (701 and lines 7-15). The logging level allows for a granular filtering of what is logged or not—if logging is enabled, i.e., level >=0 then the level allows for dynamic adjustment.

It should be understood that a library according to an embodiment of the present invention includes code embodying server sending and receiving functionality, routing instructions for communicating with managed widgets, etc.

It should be understood that the addition or sub-classing shown in FIG. 7 can be implemented using different coding techniques depending on the platform/language of the mobile device (500).

According to an embodiment of the present invention, for dynamic alteration of widgets, the widgets are altered at runtime to enable new functionality. Capabilities can depend on the underlying programming language. For example, when using JAVA byte code, modification of the widget code is performed prior to the widget being run by the application. Stated another way, in languages such as JAVA, original widgets are already compiled and exist in in byte-code form; the byte code is what is interpreted at runtime to execute the application. By altering the byte code, the behavior of the widget can be modified (e.g., to add in the logging calls, etc.). The resultant widget behaves as if the logging source lines as shown in FIG. 7 were in the original widget. Byte code modification is a technique within JAVA facilitated by tools, such as ASM.

As described above in connection with FIGS. 5 and 7, and the example for the instrumented Button widget, alterations can be made to routines that can be overridden, and into which the logging call may be added for one or more events. Depending on the original widget code, and how that code processes events, the alteration can be complicated when the event is not well isolated.

According to an embodiment of the present invention, the instrumented widget does not alter the original widget behavior within the application. For example, in the case of an instrumented widget including a local event listener enabling certain event behavior, the event behavior does not change the original widget behavior so that the application code is unaware of the instrumentation. According to an embodiment of the present invention, the local event listener is instantiated or created within a subclass to process the event logged by the instrumented widget. In a typical application, a call back upon an event can be handled by adding a listener that implements the expected application program interface (API). Internally, when the objects are sub-classed, developers have access to methods/fields that are not public to other objects. In some cases the event to be monitored is not accessible, even to a sub-class. According to an embodiment of the present invention, in the case of an inaccessible event, a call to a super class is used to add an event listener. According to an embodiment of the present invention, in the case of an object that only allows one listener, the subclass is overridden to add additional listeners such that both a new sub-class object and the application can listen to the super class.

It should be appreciated, that a sub-class can access additional fields/methods that are not part of the main public interface. If events are logged using these sub-classes, the existence of the library alterations are hidden to the application. In the case using a public interface to log events, such as adding a listener, the methods can become visible to the application. For example, in a case where an original widget allows a single listener, a newly instantiated subclass adds a listener, and the application attempts to add its own listener, the application would fail. Embodiments of the present invention include libraries that are non-disruptive to the application's behavior.

Figure 8:
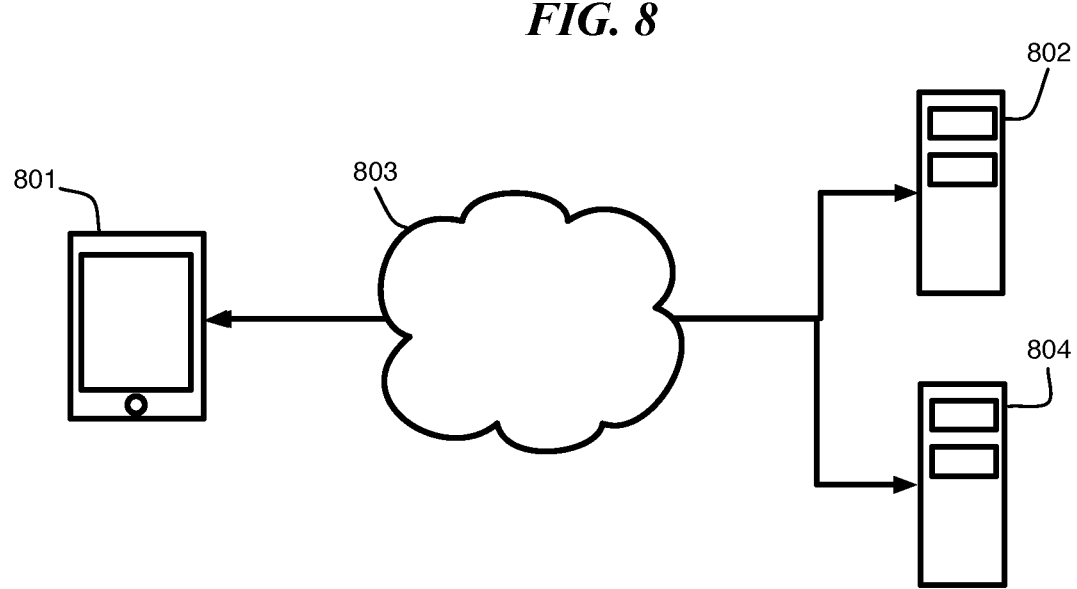
FIG. 8 is a view of a network connecting a mobile device to a monitoring server according to an exemplary embodiment of the present invention.

FIG. 8 depicts a mobile device 801 communicating with a monitoring server 802 across a computer network 803, such as the Internet. Furthermore, a developer server 804 is disposed in signal communication with the mobile device 801 to, for example, deploy applications, updates to instrumented widgets and the like. Additional computer nodes can be disposed in the computer network 803, such as app store servers and the like.

According to an embodiment of the present invention, a palette can be implemented as part of application development suite such Eclipse for ANDROID.

According to an embodiment of the present invention, management includes altering one or more aspects of an application's functionality. Alterations can include, for example, disabling/enabling a UI element, hiding or removing a UI element, changing text, etc. In one example, a UI button is selectively disabled at login based on a user's credentials, where the UI button enables access to information only for certain users (e.g., users having specific credentials). In another example, the UI button is selectively disabled based on time of day, location of a user's device running the application, etc. The application's library (and optionally the monitoring server) monitors the application, such that this information is used to manage the application.

In one or more embodiments of the present invention, functional alteration alleviates UI bugs/issues improving a user experience. In one exemplary implementation, such a functional alteration can be used as a stop-gap until a permanent solution in a new version of the application can be deployed. In one or more embodiments of the present invention, functional alteration allows application UI function to be managed in ways not originally designed into the application e.g., UI function enablement based on user, time, location etc.

According to an embodiment of the present invention, the code implementing the logging calls runs autonomously. For example, autonomous code can enable a UI element based on geo-location. In another example, library code associated with the widgets monitors a location of the mobile device and carries out enablement/disablement independent of a server.

Recapitulation:

According to an exemplary embodiment of the present invention, a method includes storing an application in a memory of a mobile device, wherein the application is associated with a widget and a library, wherein the widget includes an event logger and the library manages managing the widget (see block 402, FIG. 4), executing, by the mobile device, the application and the widget (see block 407, FIG. 4), receiving, through a user interface of the mobile device, an input corresponding to the event logger of the widget (see block 403, FIG. 4), logging, by the library, the input corresponding to the event logger of the widget in the memory of the mobile device (see block 404, FIG. 4), and reporting, by the library, the input corresponding to the event logger of the widget to a remote monitoring server as monitored data (see block 406, FIG. 4).

Figure 6:
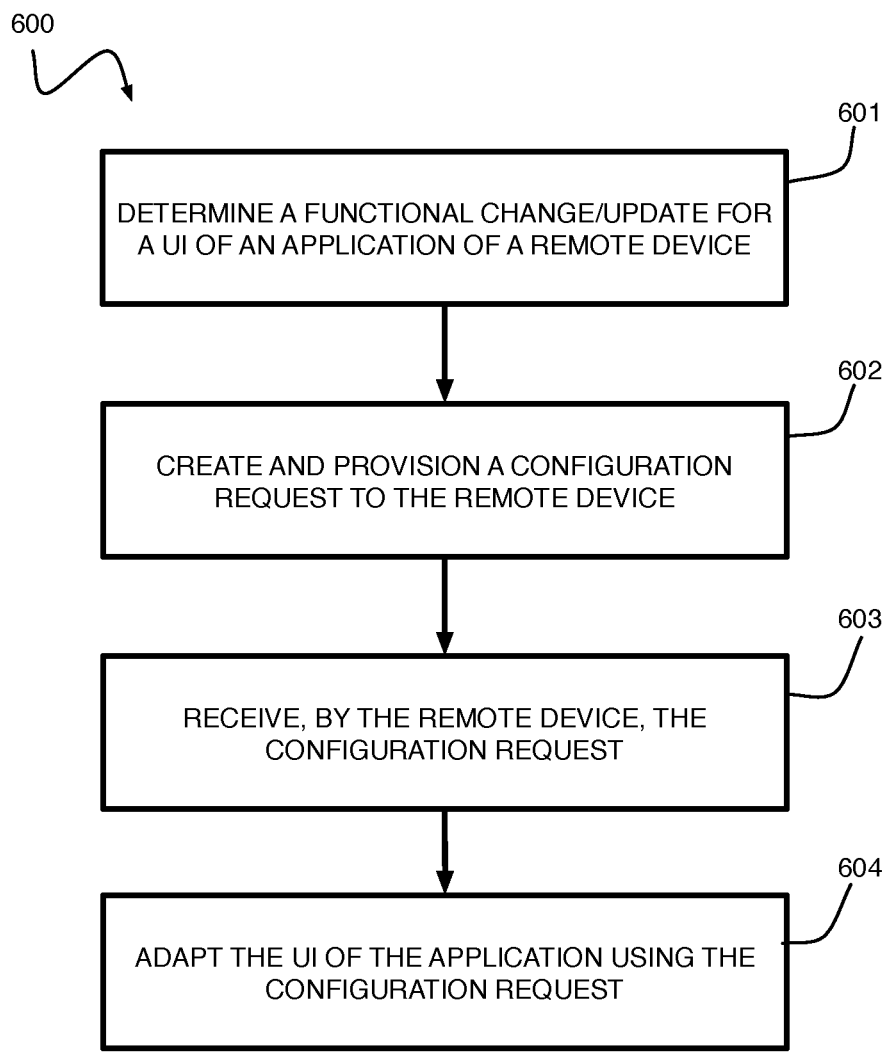
FIG. 6 is a flow diagram of a method for managing an application that uses instrumented widgets according to an embodiment of the present invention.

According to an exemplary embodiment of the present invention, a method includes executing an application on a mobile device, the application stored in a memory of the mobile device, wherein the application is associated with a widget and a library managing the widget (see 601, FIG. 6), receiving, by the library, a configuration request from a remote server (see 603, FIG. 6), and adapting, by the library, the widget using the configuration request (see 604, FIG. 6).

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a computer system for creating, deploying and managing applications including instrumented widgets. Further, a computer program product can include a tangible computer-readable recordable storage medium with code adapted to be executed to carry out one or more method steps described herein, including the provision of the system with the distinct software modules.

Figure 9:
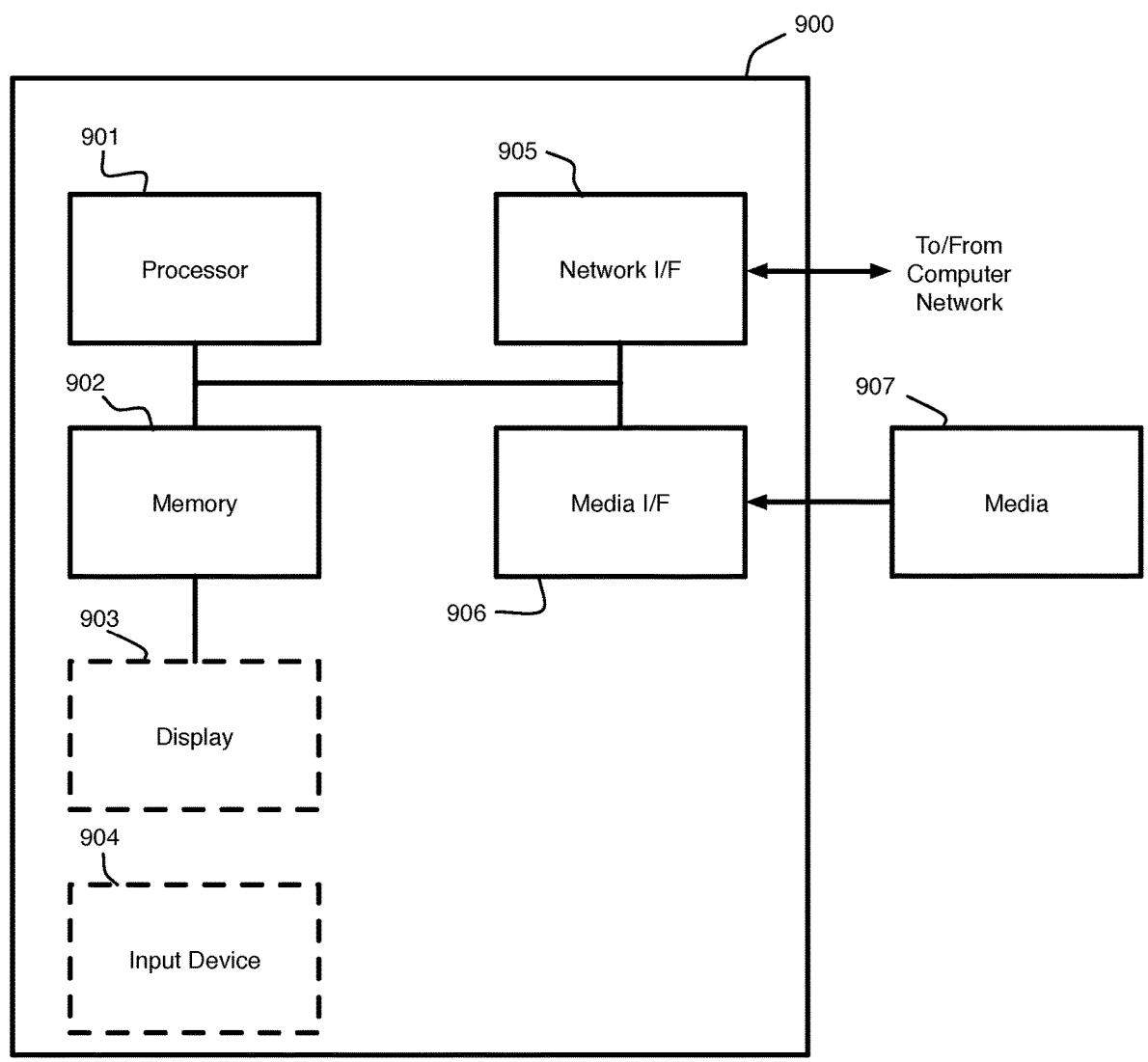
FIG. 9 is a block diagram depicting an exemplary computer system embodying a method of creating and deploying an application using instrumented widgets according to an exemplary embodiment of the present invention.

Referring to FIG. 9; FIG. 9 is a block diagram depicting an exemplary computer system 900 embodying the computer system for creating, deploying and managing applications including instrumented widgets (see e.g., FIG. 4 and FIG. 6) according to an embodiment of the present invention. The computer system shown in FIG. 9 includes a processor 901, memory 902, display 903, input device 904 (e.g., keyboard), a network interface (I/F) 905, a media I/F 906, and media 907, such as a signal source, e.g., camera, Hard Drive (HD), external memory device, etc.

In different applications, some of the components shown in FIG. 9 can be omitted. The whole system shown in FIG. 9 is controlled by computer readable instructions, which are generally stored in the media 907. The software can be downloaded from a network (not shown in the figures), stored in the media 907. Alternatively, software downloaded from a network can be loaded into the memory 902 and executed by the processor 901 so as to complete the function determined by the software.

The processor 901 may be configured to perform one or more methodologies described in the present disclosure, illustrative embodiments of which are shown in the above figures and described herein. Embodiments of the present invention can be implemented as a routine that is stored in memory 902 and executed by the processor 901 to process the signal from the media 907. As such, the computer system is a general-purpose computer system that becomes a specific purpose computer system when executing routines of the present disclosure.

Although the computer system described in FIG. 9 can support methods according to the present disclosure, this system is only one example of a computer system. Those skilled of the art should understand that other computer system designs can be used to implement embodiments of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for tracking user interactions with an application, the method comprising:
storing the application in a memory of a mobile device, wherein the application is associated with an instrumented widget and a library, wherein the widget includes an event logger and the library manages the widget;
executing, by the mobile device, the application and the widget;
receiving, through a user interface of the mobile device, an input corresponding to the event logger of the widget;
logging, by the library, the input corresponding to the event logger of the widget in the memory of the mobile device;
filtering a plurality of events, including the input corresponding to the event logger of the widget, to manage what data is reported to a monitor; and
transmitting the input corresponding to the event logger of the widget to a server as monitored data,
wherein the widget comprises a user interface object provided in the application, and the widget can be dynamically instrumented at run time to alter the widget's function without having to recompile the application's code,
wherein changes to the user interface's behavior due to the instrumented widget is transparent to the application, wherein the application need not perceive the changes and continues to function unaffected by the changes.

2. The method of claim 1, further comprising providing the event logger in a subclass of the widget.

3. The method of claim 1, wherein the plurality of events, including the input corresponding to the event logger of the widget, are logged in the memory of the mobile device.

4. The method of claim 1, wherein the filtering is performed using at least one of a measure of bandwidth consumed by the reporting and a battery condition of the mobile device.

5. The method of claim 1, further comprising:
receiving, by the library, a configuration request from a remote configuration server; and
adapting, by the library, the application using the configuration request, wherein the library acts on the configuration request to modify the event logger in the subclass of the widget.

6. The method of claim 1, further comprising controlling a frequency of reporting of logged data as a function of battery level of the mobile device.

7. The method of claim 1, wherein the filtering comprises discarding select data as a function of bandwidth requirements for transmitted logging traffic.

8. The method of claim 1, wherein the widget is instantiated by the application at run-time.

9. A method comprising:
executing an application on a mobile device, the application stored in a memory of the mobile device, wherein the application is associated with an instrumented widget and a library managing the widget, the widget including an event logger for logging user interactions with the application, wherein upon an occurrence of an event associated with the widget, a logged event is recorded in the library by the event logger;
receiving, by the library, a configuration request from a remote server; and
adapting, by library code associated with the widget, a user interface running on the mobile device using the configuration request by calling upon a control mechanism in the widget to enact the request, wherein the widget comprises a user interface object provided in the application, and the widget can be dynamically instrumented at run time to alter the widget's function without having to recompile the application's code, wherein changes to the user interface's behavior due to the instrumented widget is transparent to the application, wherein the application need not perceive the changes and continues to function unaffected by the changes.

10. The method of claim 9, further comprising reporting, by the library, the logged event to a server as monitored data.

11. The method of claim 9, further comprising:
displaying, by the mobile device, a user interface element embodying the widget; and
receiving, by the user interface element, an input corresponding to the widget.

12. The method of claim 9, wherein the adapting of the user interface is performed by code injection, including adding code as a subclass of the widget.

13. The method of claim 9, further comprising collecting, by the library, a plurality of logged events from a plurality of widgets associated with the application, including the instrumented widget, wherein the library manages which of the plurality of logged events is reported to a server as monitored data.

14. A computer program product comprising a computer readable storage medium having program instructions embodied therewith, the program instructions executable by at least one processor to cause the processor to:
store an application in a memory of a mobile device, wherein the application is associated with an instrumented widget and a library, wherein the widget includes an event logger and the library manages the widget;
execute, by the mobile device, the application and the widget;
receive, through a user interface of the mobile device, an input corresponding to the event logger of the widget;
log, by the library, the input corresponding to the event logger of the widget in the memory of the mobile device;
filter a plurality of events, including the input corresponding to the event logger of the widget, to manage what data is reported to a monitor; and
transmit the input corresponding to the event logger of the widget to a server as monitored data,
wherein the widget comprises a user interface object provided in the application, and the widget can be dynamically instrumented at run time to alter the widget's function without having to recompile the application's code,
wherein changes to the user interface's behavior due to the instrumented widget is transparent to the application, wherein the application need not perceive the changes and continues to function unaffected by the changes.

15. The computer program product of claim 14, wherein the program instructions are further executable by the processor to cause the processor to provide the event logger in a subclass of the widget.

16. The computer program product of claim 14, wherein a plurality of events, including the input corresponding to the event logger of the widget, are logged in the memory of the mobile device.

17. The computer program product of claim 14, wherein the filtering is performed using at least one of a measured of bandwidth consumed by the reporting and a battery condition of the mobile device.

18. The computer program product of claim 14, wherein the program instructions are further executable by the processor to cause the processor to:
receive, by the library, a configuration request from a remote configuration server; and
adapt, by the library, the application using the configuration request, wherein the library acts on the configuration request to modify the event logger in the subclass of the widget.

19. The computer product of claim 14, wherein the program instructions are further executable by the processor to cause the processor to control a frequency of reporting of logged data as a function of battery level of the mobile device.

* * * * *